May 12, 1931.　　　　E. R. CARR　　　　1,804,671

POULTRY COOP GATE

Filed Sept. 22, 1930

Inventor.
Ernest R. Carr,
By Banning & Banning
Attys.

Patented May 12, 1931

1,804,671

UNITED STATES PATENT OFFICE

ERNEST R. CARR, OF CLINTON, IOWA, ASSIGNOR TO THE COLLIS COMPANY, OF CLINTON, IOWA, A CORPORATION OF IOWA

POULTRY COOP GATE

Application filed September 22, 1930. Serial No. 483,434.

This invention relates to a gate adapted for coops such as are used for the confinement of poultry. For reasons of sanitation, ventilation, etc., it is customary to construct such coops of spaced wires carried on a frame with openings over which are fitted gates also of wire construction. The present improvements have to do with such a gate which is sturdy, easily manipulatable so as to remain in either open or closed position, and proof against accidental operation.

A suggestive embodiment of my invention is set forth in the accompanying drawings, wherein—

Figure 2:
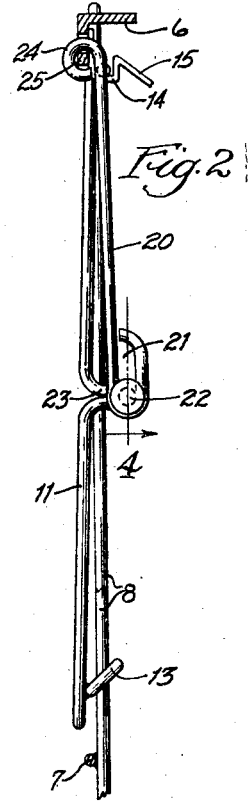
Fig. 2 is a view in section on line 2 of Fig. 1.
Figure 3:
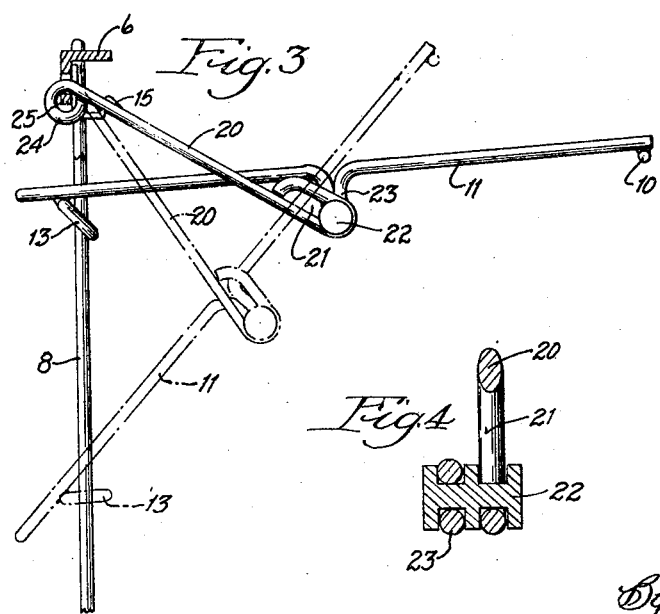
Figure 4:
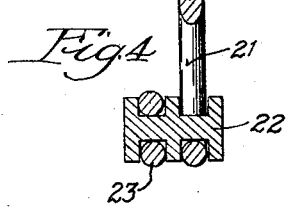

Fig. 3 which is a view similar to Fig. 2 shows the gate in full lines in extreme open position, and in dotted lines in partially open position;

Fig. 4 is a detail in section on line 4 of Fig. 2; and

Figure 1:
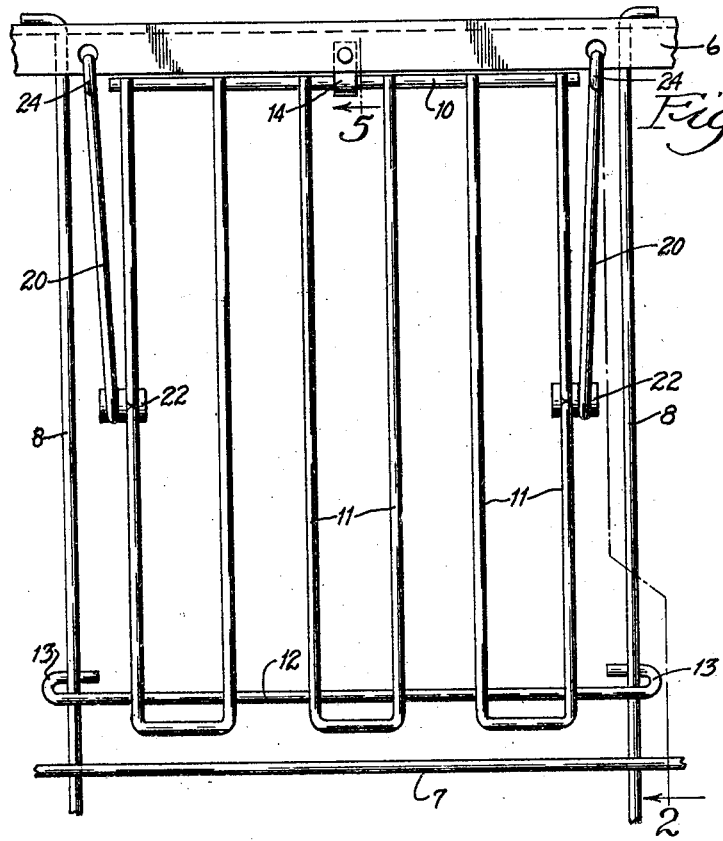
Figure 1 is a view in elevation of the gate fitted within a coop opening intended for its reception.
Figure 5:
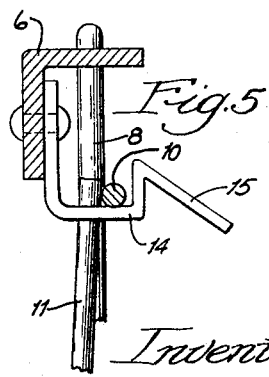

Fig. 5 is a detail in section on line 5 of Fig. 1.

So much of a coop as I have illustrated includes upper and lower frame bars or wires 6 and 7 supporting between them vertical guide wires 8 providing a frame which defines a rectangular opening adapted to be closed by a gate furnished with a horizontal top wire 10 furnishing support for a plurality of vertical wires 11 properly spaced with respect to each other and to the coop guide wires to afford a desired degree of confinement to poultry or other animals which are kept within the coop. Adjacent the lower end of the gate and joined to the vertical wires thereof is a horizontal cross wire 12 with its two ends looped around at 13 to encircle the guide wires 8. When the gate is closed, as shown at Figs. 1, 2 and 5, its top wire drops down into a depression formed in a latch 14 which is supported from the coop frame above the gate, the latch being provided with an inclined way 15, as shown.

The gate is additionally suspended by a pair of link arms 20, one at each side thereof. The lower end of each arm is turned upon itself to provide a loop 21 elongated in the direction of the arm length. Through each of these loops is extended a pin 22 having grooves in one of which is fitted the looped end of the arm. In the other of these grooves is received an eye 23 formed by a rearward extended outside vertical wire 11 of the gate. Each of the arms at its upper end is formed with an eye 24 for pivotal connection as at 25 with the frame bar 6.

The gate, which tends, by gravity, to swing and drop to a down and closed position, is normally held against movement when its top wire is received within the depression of the latch. In reaching this position, the looped ends of the lower cross wire of the gate are free to slide upon the guide wires of the coop. It should be noted that the disposition of these loops is about evenly between the vertical and horizontal, permitting their free movement upon the guide wires whether the gate be vertical or horizontal or in an intermediate position (see Fig. 3). In executing these movements, the two link arms support the upper end of the gate which swings inwardly. Near its extreme upper position, these links form with the gate and guide wires a triangle in which the out-thrust exerted against the guide wires is such as to cause considerable friction which increases with a lessening of the vertical component of the triangle. This friction is relied upon to sustain the lower (outer) end of the gate when the same is raised, as when the parts are swung to the position of Fig. 3. No catch of any kind is required to maintain the gate open. When the lower (outer) end of the gate is pulled down sufficiently to reduce the friction against the guide wires to a point permitting the gate to drop, it will do so with the consequence that the upper (inner) end of the gate will be brought to the initial position to slide up and over the inclined way to drop within the depression of the latch, the elongated loops at the longer ends of the links permitting a slip movement sufficient for this purpose.

The present gate is advantageous in that it is self-locking in both open and closed positions. Also it may be utilized in batteries of feeding coops without requiring any one gate to move upwardly or downwardly past an adjacent coop, inasmuch as the movements of the gate are executed between the planes defined by its own upper and lower coop edges.

I claim:

1. In combination with a coop having a frame defining an opening with guide wires at opposite sides thereof, a gate in which is comprised a bottom horizontal wire with its ends looped around the guide wires, a series of vertical wires joined at their lower ends to the horizontal wire, a top horizontal wire connected to the vertical wires, a latch with which the top wire is adapted to engage to hold the gate closed, and a pair of link arms pivotally connected to the coop structure above the gate and to the latter at a point intermediately of its upper and lower ends adapted to cause the gate to move in and swing to a substantially horizontal position while its lower horizontal wire remains looped upon the guide wires.

2. In combination with a coop having a frame defining an opening with guide wires at opposite sides thereof, a gate connected at its lower end to slide along the guide wires and connected by links at places removed from the gate bottom with the frame above the opening, the gate being movable from a vertical to a horizontal position to exert a maximum friction against the guide wires in the latter position.

3. In combination with a coop having a frame defining an opening upon opposite sides of which are guide wires, a gate fitted within the opening having adjacent its bottom slidable connections with the guide wires, links extending from the frame above the opening for slip pivotal connection with the gate at points remote from the bottom thereof, and means forming a latch connection between the frame and gate top when the gate is in closed position.

4. In combination with a coop having a frame defining an opening, a gate fitted within the opening, means forming a sliding connection between opposite sides of the gate adjacent the bottom and the proximate sides of the frame, and means forming a link connection between the gate at points remote from its bottom and the frame above the opening, the gate being adapted in response to a lifting force applied to its bottom to swing into a horizontal position adjacent the top of the frame opening.

5. In combination with a coop having a frame defining an opening with guide wires adjacent the opposite sides thereof, a gate having adjacent its bottom loops engaging the guide wires, the loops being extended in a common plan obliquely with respect to the horizontal and vertical, and pivotal connections between the gate at points remote from its bottom and the frame above the opening adapted to provide a swinging mounting on which the gate may swing when its bottom is raised along the guide wires.

6. In combination with a coop having a frame defining an opening having guide wires adjacent opposite sides thereof, a gate fitted into the opening formed of horizontally connected intersecting wires, means slidably connecting the gate adjacent its bottom with the guide wires, loops rearwardly extended from the spaced gate wires at points remote from its bottom, wires forming link connections between the frame above the opening and the loops distended from the gate, and latch means cooperating with the gate when the latter is closed to prevent accidental movement.

7. In combination with a coop having a frame defining an opening, a gate in the opening, a sliding connection between the gate bottom and frame ends, and a swinging pivotal connection between the gate sides and frame top.

8. In combination with a coop having a frame defining an opening, a gate in the opening, a sliding connection between the gate bottom and frame ends, and a swinging slip pivotal connection between the gate sides and frame top.

9. In combination with a coop having a frame defining an opening, a gate adjacent one of its edges having a sliding connection with the frame, and remote therefrom a swinging pivotal connection with the frame.

ERNEST R. CARR.